Patented Apr. 10, 1934

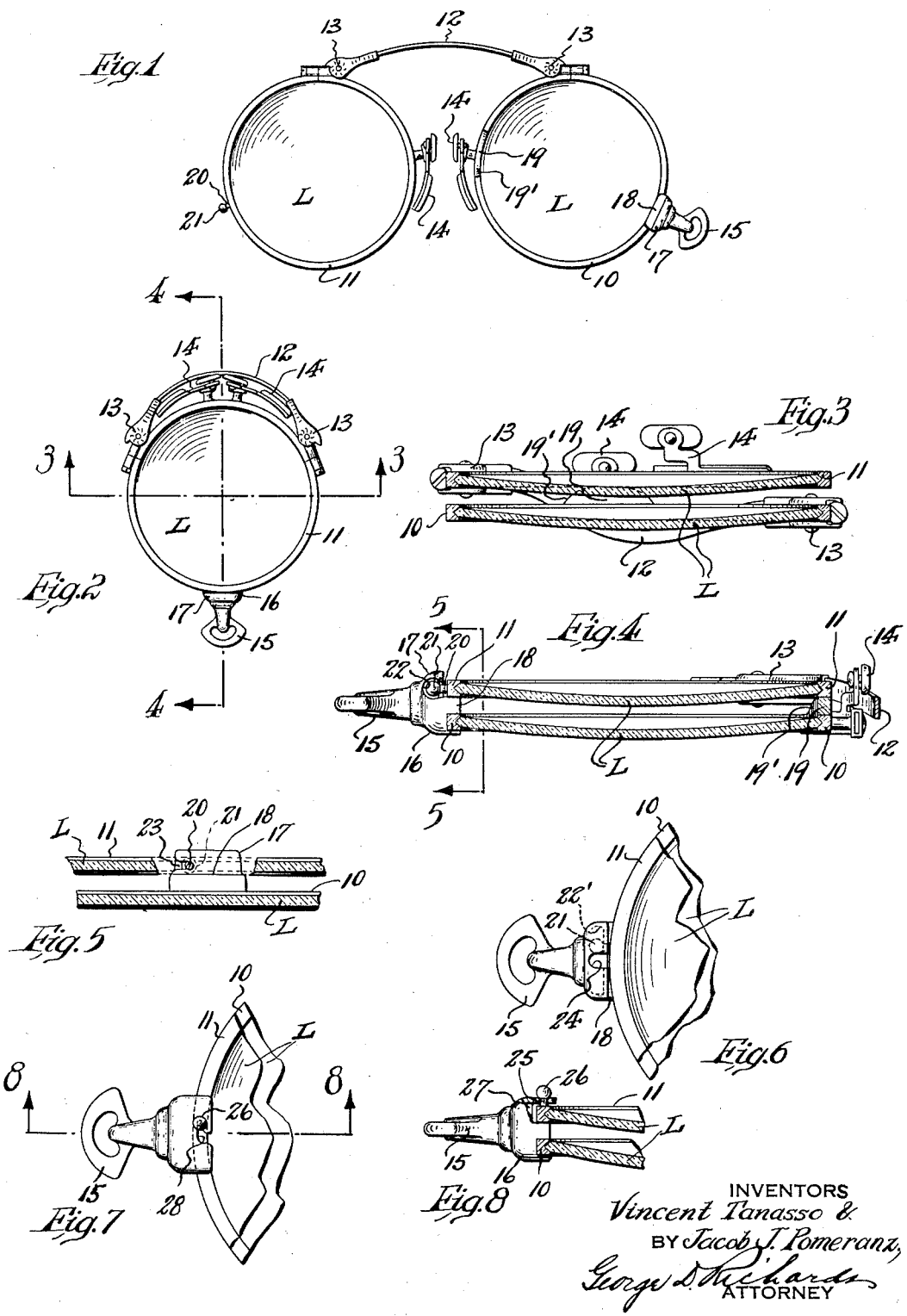

1,953,995

UNITED STATES PATENT OFFICE 1,953,995

FOLDING OXFORD EYEGLASSES

Vincent Tanasso, Harrison, and Jacob J. Pomeranz, Brooklyn, N. Y.

Application January 18, 1933, Serial No. 652,248

7 Claims. (Cl. 88—44)

This invention relates to improvements in folding eye-glasses of the so-called Oxford type; and the invention has reference, more particularly, to improved means for retaining such eyeglasses in their folded condition.

This invention has for its principal object to provide a novel means for holding the lenses of the eyeglasses in superimposed relation when folded together, and also for spacing the superimposed lenses in fended relation one to another so that rubbing of the lens surfaces one against the other is avoided, thereby eliminating risk of abrasions, scratches or like injury to such surfaces, not only while carrying the glasses in relation to each other, but also during the acts of folding or unfolding the eyeglasses.

Other objects of this invention, not at this time more particularly enumerated, will be understood from the following detailed description of the same.

Illustrative embodiments of this invention are shown in the accompanying drawing, in which:—

Fig. 1 is a rear or inside face view of a pair of folding eyeglasses of the Oxford type as unfolded for use; and Fig. 2 is a similar view of the same in folded condition. Fig. 3 is a sectional view, drawn on an enlarged scale, taken on line 3—3 in Fig. 2; Fig. 4 is a sectional view, also drawn on an enlarged scale, taken on line 4—4 in Fig. 2; Fig. 5 is a fragmentary sectional view, taken on line 5—5 in Fig. 4. Fig. 6 is a fragmentary view, similar to that of Fig. 2, but showing a modified form of holding catch mechanism; Fig. 7 is also a fragmentary view, similar to that of Fig. 2, but showing another modified construction of catch mechanism; and Fig. 8 is a sectional view, taken on line 8—8 in Fig. 7.

Similar characters of reference are employed in the above described views, to indicate corresponding parts.

Referring to said drawing, the reference characters 10 and 11 indicate the respective lens rims which are connected by an intermediate spring bridge 12, the respective ends of which are connected with respective lens rims by spring-pivot connections 13 in the manner familiar to those acquainted with the art. Connected with opposed inner margins of the respective lens rims 10 and 11 are suitably constructed nose-clips 14. Each lens rim is adapted to hold a lens L.

The lens rims, as shown in the drawing, are arranged in such relation that the rim 10 is the underfolding rim and the rim 11 the overfolding rim when the eyeglasses are moved to folded condition. Connected with the underfolding rim 10, at the outer side thereof, is a handle or fingerpiece 15 which has its base 16 suitably and rigidly affixed to said rim, with a portion of this base inwardly or rearwardly offset, as at 17, relative to the plane of the rear or inside face of the lens rim and lens supported thereby. Formed in connection with base 17, to overlie the rear or inside face of the lens rim 10 is a spacer abutment or shoulder 18 to provide a support or rest for the overfolding lens rim 11 and its lens, when moved to folded position. Provided in connection with the rear or inside face of the lens rim 10, and suitably affixed thereto, preferably at a point thereon which is approximately diametrically opposite the location of the spacer abutment or shoulder 18 which is provided as part of the handle or finger piece, is an inwardly or rearwardly projecting spacer block or lug 19.

Provided in connection with the perimeter of the lens rim 11 is a male holding catch element. This catch element, in one form and arrangement thereof, comprises a shank 20 which extends radially from the rim 11 and which terminates in an enlarged head 21, the latter preferably being of spherical form. Provided in connection with the offset portion 17 of the finger piece or handle base 16 is a female holding catch means with which said male holding catch element cooperates. Said female holding catch means, in one form and arrangement thereof, comprises a transverse receiving cavity or socket 22 opening endwise at the right hand end of said offset portion 17 of the finger piece or handle base. The exterior wall of said cavity or socket 22 is provided with slot 23 to accommodate the shank 20 of the female catch element.

In folding the eyeglasses, the movement imparted to the overfolding lens rim and its lens is of a rotary or winding character, to which the spring bridge 12 together with spring pivot connections 13 yield. By such movement said overfolding lens rim 11 and its lens is carried into superimposed or overlying relation to the lens rim 10 and its lens, whereby said lens rim 11 is caused to ride onto the spacer abutment or shoulder 18 at the other side, thereby spacing the lens rim 11 and its lens away from the lens rim 10 and its lens. As a consequence of such spaced relation of the rims and lens when folded together, it will be obvious that these parts, and especially the lenses, are fended one from another so as to avoid all rubbing contact, to the end that any tendency to produce abrasions, scratches or like injuries to the lenses is entirely eliminated, not only during relative folding and unfolding movements, but also when the eyeglasses are carried about in folded condition. This novel arrangement is of especial advantage when the lens rims are equipped with toric lenses having surfaces projecting beyond the plane of the lens rims. Preferably the spacer block or lug 19 is provided with inclined, tapered or chamfered ends 19′ to assure the smooth and easy riding of the overfolding lens rim up onto said spacer block or lug 19. Although in the drawing but one spacer block or lug 19 is shown, it will be obvious that a plurality thereof may be employed if desired suitably spaced in relation to each other and in relation to the spacer abutment or shoulder 18 of the finger-piece or handle base.

In order to retain the eyeglasses in the above described folded condition, the overfolding rim 11 is initially rotated for enough to carry the male holding catch element over and beyond the base 16 of the handle or finger piece 15, whereupon the rim 11 is pressed downward upon the spacer abutment or shoulder 18 to carry the head 21 into alignment with the open end of the cavity or socket 22 of the female holding catch means. When thus positioned, the lens rim 11 is released so that the tension of the spring bridge 12 exerted upon the overfolding lens rim tends to reverse the movement thereof, whereby the head 21 enters the cavity or socket 22 until arrested by the shank 20 which, at the same time, enters the slot 23 so as to abut the end thereof. It will be observed that, when releasing the overfolding lens rim 11 to unfold the eyeglasses, the male holding catch element is pressed out of the female catch means, whereupon the lens rim 11 is lifted somewhat to allow the former to pass over the base of the finger-piece or handle. This is of advantage since it requires a further relative separation of the lens rims and their lenses, and thereby further assures against rubbing contact of the lenses one with another as the rims move apart to unfolded positions.

In its broader aspects, this invention, with respect to the provision of the spacer abutments to fend the lens rims and lenses one from another when folded together, may be employed with any suitable type or kind of cooperating holding catch means, other than that above described, the latter being, however, a preferable form. Various modifications of the preferred type of cooperating holding catch means may be employed, as, for example, those shown in Fig. 6 and in Figs. 7 and 8. In Fig. 6 instead of providing the cavity of the female catch means with an endwise opening entrance, the cavity or socket, as 22′ in said Fig. 6, may be provided with a top opening 24 leading downwardly into the cavity or socket. In Figs. 7 and 8 another modified arrangement is shown, wherein the male holding catch element, instead of projecting radially from the overfolding lens rim 11 is arranged to project angularly from the rear or inward face plane thereof; as thus arranged such catch element comprises the shank 25 and head 26. To cooperate with this modified arrangement of the male holding catch element, the female catch means comprising a cavity or socket 27 open at its inner transverse face, and arranged to overhang the spacer abutment or shoulder 18. The top wall of said cavity or socket 27 is provided with a bayonet slot 28, in which the shank 25 may be entered and engaged. The especial advantage of this arrangement lies in the fact that the male holding catch means lies behind the rear face of the lens rim 11, and is thus concealed when the eyeglasses are unfolded and worn by the user, thus enhancing the neat appearance of the eyeglasses, which is desirable in Oxford types thereof which are, in many cases, especially worn by the users with formal dress.

It will be understood that the structures hereinabove described are capable of embodiment in eyeglass frames or mountings made of various materials, or combinations of materials, such as all metal frames, pyroxylin or like composition frames, or composite frames of metal and pyroxylin or similar compositions.

We are aware that many changes could be made in the above described constructions, and many apparently widely different embodiments of this invention could be made without departing from the scope thereof. It is therefore intended that all matter contained in the above description or shown in the accompanying drawing shall be interpreted as illustrative and not in a limiting sense.

We claim:—

1. In folding eyeglasses, the combination with a pair of relatively foldable thin metallic lens rims of spacer abutments fixed directly to and projecting from a face plane of a rim at circumferentially spaced points adapted to fend the lens rims and lenses carried thereby against contact one with the other when said lens rims are folded together.

2. In folding eyeglasses, the combination with a pair of relatively foldable thin metallic lens rims having cooperating catch means to hold the same in folded relation of spacer abutments fixed directly to and projecting from a face plane of a rim at circumferentially spaced points adapted to be disposed between said lens rims thereby to fend the same and lenses carried thereby against contact one with the other when folded together.

3. In folding eyeglasses, the combination of relatively foldable thin metallic lens rims, spring-bridge means connecting said rims, a finger-piece on one rim having a female holding catch means, a male holding catch means on the other rim, said finger-piece having a spacer abutment overhanging a face plane of said first mentioned rim to engage and separate the rims at one point when folded together, and a spacer lug carried by a rim to project from a face plane thereof at a point remote from said finger piece to engage and separate the rims at another point when in folded condition.

4. In folding eyeglasses, the combination of relatively foldable thin metallic lens rims, spring-bridge means connecting said rims, a finger-piece on one rim, said finger piece having a spacer shoulder overlying the inner face of said rim to project from the plane of said face, said finger-piece having a catch socket provided with means of access thereinto, the other rim having a catch projection engageable in said catch socket to retain the rims in folded relation, and a spacer lug carried by a rim to project from a face plane thereof at a point remote from said spacer shoulder of the finger piece.

5. In folding eyeglasses, the combination of relatively foldable lens rims, spring-bridge means connecting said rims, a finger-piece on one rim having a portion rearwardly offset relative to the rearward face plane of said rim, said offset portion having an open catch socket provided with a slotted outer wall, and a catch shank connected with and projecting from the other rim and having an enlarged head at its free end, the slot of said slotted wall being sized to fit and receive said shank but preventing lateral displacement of said head through said wall.

6. In folding eyeglasses, the combination of relatively foldable thin metallic lens rims, spring-bridge means connecting said rims, a finger-piece on one rim, said finger-piece having a spacer shoulder overlying the rearward face of said rim, said finger-piece having a portion rearwardly offset above and outwardly of said spacer shoulder, said offset portion having an open catch socket provided with a slotted outer wall, a catch shank connected with and projecting from the other rim and having a head at its free end, said head being enterable in said catch socket with said shank engaged through said slotted wall, and a spacer lug carried by a rim to project from a face plane thereof at a point remote from said spacer shoulder of the finger-piece.

7. In folding eyeglasses, the combination of relatively foldable thin metallic lens rims, spring-bridge means connecting said rims, a finger-piece having a spacer shoulder overlying the rearward face of one rim, said finger-piece having a portion rearwardly offset above and outwardly of said spacer shoulder, said offset portion having an endwise open catch socket provided with a slotted exterior side wall toward said rim, a catch shank radially projecting from the other rim and having a head at its free end, said head being enterable in said catch socket with said shank engaged through said slotted wall, and a spacer lug carried by a rim to project from a face plane thereof at a point remote from said spacer shoulder of the finger-piece.

VINCENT TANASSO.
JACOB J. POMERANZ.